(12) United States Patent
Tanigawa et al.

(10) Patent No.: US 12,174,838 B2
(45) Date of Patent: Dec. 24, 2024

(54) COMPUTER SYSTEM AND DATA PROVIDING METHOD

(71) Applicant: Hitachi, Ltd., Tokyo (JP)

(72) Inventors: Keiko Tanigawa, Tokyo (JP); Yohsuke Ishii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/368,361

(22) Filed: Sep. 14, 2023

(65) Prior Publication Data

US 2024/0289339 A1    Aug. 29, 2024

(30) Foreign Application Priority Data

Feb. 28, 2023    (JP) .................................. 2023-029630

(51) Int. Cl.
*G06F 16/00* (2019.01)
*G06F 16/2457* (2019.01)
*G06F 16/248* (2019.01)

(52) U.S. Cl.
CPC ...... *G06F 16/24575* (2019.01); *G06F 16/248* (2019.01)

(58) Field of Classification Search
CPC .......................... G06F 16/24575; G06F 16/248
See application file for complete search history.

(56) References Cited

U.S. PATENT DOCUMENTS

| 8,396,845 B2* | 3/2013 | Bahat ..................... G06F 16/907 707/999.102 |
| 2003/0158947 A1* | 8/2003 | Bloch ................. G06F 16/9574 709/227 |
| 2004/0117759 A1* | 6/2004 | Rippert, Jr. ................ G06F 8/20 717/113 |
| 2004/0230559 A1* | 11/2004 | Newman .................. G06F 16/25 |
| 2007/0056047 A1* | 3/2007 | Claudator ............ H04L 63/0428 726/28 |
| 2009/0307195 A1 | 12/2009 | Anno |
| 2010/0287214 A1* | 11/2010 | Narasayya ............ G06F 16/217 707/759 |
| 2014/0095450 A1* | 4/2014 | Marwah .................. G06F 16/21 707/668 |
| 2020/0348878 A1* | 11/2020 | Leskes ..................... G06F 16/31 |
| 2021/0064360 A1* | 3/2021 | Moser ................. G06F 9/44536 |

FOREIGN PATENT DOCUMENTS

JP    2009-295008 A    12/2009

* cited by examiner

*Primary Examiner* — Syed H Hasan
(74) *Attorney, Agent, or Firm* — PROCOPIO, CORY, HARGREAVES & SAVITCH LLP

(57) ABSTRACT

A computer system is connected to a database, is capable of accessing a data catalog that manages an item for searching for data stored in the database, and holds data requirement management information for managing requirement data associated with a phase of a life cycle of an application and a data requirement. The computer system searches for data matching a search condition with reference to the data catalog when a search request including the search condition is received; specifies the requirement data corresponding to the phase with reference to the data requirement management information when an output request including information of data selected by the user and the phase is received; and outputs use data to be used in the phase based on the selected data and the specified requirement data.

7 Claims, 21 Drawing Sheets

FIG. 4

| DATA ID | METADATA ||||||| |
|---|---|---|---|---|---|---|---|
| | SCHEMA | FIELD | PURPOSE | ACCESS RIGHT | TAG | ... | LINEAGE |
| D00001 | DATE AND TIME, SENSOR 1, SENSOR 2,... | INDUSTRY | DEFECT ANALYSIS | FACTORY 1 LINE A EMPLOYEES, FACTORY 1 ANALYZER | raw | ... | HubA→kafka-LINE A_FACILITY A |
| D00002 | DATE AND TIME, TEMPERATURE 1, HUMIDITY 1,... | INDUSTRY | DEFECT ANALYSIS | FACTORY 1 LINE A EMPLOYEES, FACTORY 1 ANALYZER | raw | ... | HubA-kafka-LINE A_ENVIRONMENT 1 |
| ... | ... | ... | ... | ... | ... | ... | ... |
| D01523 | LINE A, YIELD, INTERMEDIATE 1,... | INDUSTRY | IMPROVE IN YIELD | FACTORY 1 LINE A EMPLOYEES, FACTORY 1 ANALYZER | INTERMEDIATE, SL5 | ... | {xxxx, yyyy}- JOIN -{}-f()→LINE A, YIELD_INTERMEDIATE 1 |
| D01524 | LINE A, YIELD, INTERMEDIATE 2,... | INDUSTRY | IMPROVE IN YIELD | FACTORY 1 LINE A EMPLOYEES, FACTORY 1 ANALYZER | INTERMEDIATE, SL5 | ... | {xxxx, yyyy}-LINE A, JOIN-{} |
| ... | ... | ... | ... | ... | ... | ... | ... |

FIG. 5

| APP ID | METADATA ||||| PARAMETER |||
|---|---|---|---|---|---|---|---|---|
| | REGISTRANT | REGISTRATION DATE | PURPOSE | TAG | ... | METHOD | INPUT | ... |
| A00001 | Degital Agency | 2022.04.01 | INVENTORY OPTIMIZATION | service level, PII, | ... | POST | xxxx | ... |
| ... | ... | ... | ... | ... | ... | ... | ... | ... |
| A00010 | City A | 2022.04.01 | INVENTORY OPTIMIZATION | data_access_level, PII, | ... | GET | xxxx | ... |
| | | | | | | POST | xxxx | ... |
| A00011 | City A | 2022.04.01 | INVENTORY OPTIMIZATION | data_access_level, internal, Certificate of residence, PII, | ... | GET | xxxx | ... |
| | | | | | | POST | xxxx | ... |
| ... | ... | ... | ... | ... | ... | ... | ... | ... |

FIG. 6

| USER ID | USER NAME | AFFILIATION | ATTRIBUTE | ENVIRONMENT | |
|---|---|---|---|---|---|
| | | | | CLASSIFICATION | TOOL |
| U10001 | Hitachi, Taro | Pref.A CityA PROVISION APPLICATION SECTION | LEVEL 0 | ON-PREMISES | LowCode TOOL A, AUTHENTICATION APPROVAL TOOL A |
| U10002 | Kokubunji, Jiro | Pref.B CityB PROVISION APPLICATION SECTION | LEVEL 1 | CLOUD | CLOUD MANAGED SERVICE, Python, AUTHENTICATION APPROVAL TOOL B |
| ... | ... | ... | ... | ... | ... |
| U10100 | Yokohama, Hanako | Pref.A CityA SYSTEM DEVELOPMENT DEPARTMENT | LEVEL 5 | ON-PREMISES | Python, R, Javascript, AUTHENTICATION APPROVAL TOOL A |
| ... | ... | ... | ... | CLOUD | CLOUD MANAGED SERVICE |

| 701 | 702 | 703 | 704 | 705 | 706 | 707 | 708 |
|---|---|---|---|---|---|---|---|
| APP ID | FIELD | PURPOSE | PHASE | START TIME | END TIME | DB NAME | QUERY STATEMENT | ... |
| A00001 | INDUSTRY | INVENTORY OPTIMIZATION | DEVELOPMENT | | 2022/10/01 09:00:00 | DB1 | create table ... | ... |
| A00001 | INDUSTRY | UNIT TEST | DEVELOPMENT | 2022/10/01 09:10:00 | 2022/10/01 09:14:00 | DB1 | select A,*, ... | ... |
| A00001 | INDUSTRY | LINK TEST | DEVELOPMENT | 2022/10/01 10:00:00 | 2022/10/01 11:00:00 | DB1 | create database... | ... |
| A00001 | INDUSTRY | OPERATION | DEVELOPMENT | 2022/10/01 | 14:00:00 | DB1 | select A,*, ... | ... |
| ... | ... | ... | ... | ... | ... | ... | ... | ... |

| 801 | 802 | 803 | 804 | 805 | | | 806 |
|---|---|---|---|---|---|---|---|
| | | | | DATA REQUIREMENT | | | |
| ID | FIELD | PURPOSE | PHASE | DATA AMOUNT | REFERENCE DATA | ... | NUMBER OF USES |
| R00001 | COMMERCE | INVENTORY OPTIMIZATION | DEVELOPMENT | 1000 LINES | GENERATION; ID MANAGEMENT DB; | ⋮ | |
| R00002 | COMMERCE | INVENTORY OPTIMIZATION | DEVELOPMENT | - | REFERENCE; DEVELOPMENT PHASE GENERATION DATA; | ⋮ | |
| R00003 | COMMERCE | INVENTORY OPTIMIZATION | DEVELOPMENT | SNAPSHOT | GENERATION; DM_stock; | ⋮ | |
| R00004 | COMMERCE | INVENTORY OPTIMIZATION | DEVELOPMENT | LATEST ONE WEEK | REFERENCE; DM_stock; | ⋮ | |
| R00005 | COMMERCE | INVENTORY OPTIMIZATION | DEVELOPMENT | ONE DAY | REFERENCE; INVENTORY MANAGEMENT BACKUP DB | ⋮ | |
| R00006 | COMMERCE | INVENTORY OPTIMIZATION | DEVELOPMENT | ONE DAY | REFERENCE; INVENTORY MANAGEMENT BACKUP DB | ⋮ | |
| R00007 | COMMERCE | INVENTORY OPTIMIZATION | DEVELOPMENT | LATEST ONE MONTH | REFERENCE; INVENTORY MANAGEMENT BACKUP DB | ⋮ | |
| R00008 | COMMERCE | INVENTORY OPTIMIZATION | DEVELOPMENT | LATEST ONE MONTH | REFERENCE; INVENTORY MANAGEMENT DB | ⋮ | |
| ... | ... | ... | ... | ... | ... | ⋮ | ... |

FIG. 9

| ID (901) | INPUT DATA (902) | PROCESSING (903) | OUTPUT DATA (904) | NUMBER OF USES (905) | REGISTRANT (906) | CATALOG REGISTRATION (907, 313) | |
|---|---|---|---|---|---|---|---|
| | | | | | | TEMPORARY DATA ID | DATA ID |
| M00001 | D00001,D00002 | JOIN | V00001 | 19462 | U10001 | V00001 | D304597 |
| M00002 | V00001,D00100,D00101 | JOIN | V00002 | 10023 | U10001 | V00002 | D356223 |
| M00003 | V00002,D012469 | FUNC() | D008536 | 7832 | U10001 | | |
| M00004 | D008536 | CREATE MODEL | model1 | 5612 | U10001 | | |
| ... | ... | ... | ... | ... | ... | ... | ... |
| M01000 | D026330,D23510 | JOIN | V03624 | 83 | U10002 | | |
| M01001 | V03624,D000100 | JOIN | D10023 | 77 | U10002 | | |
| M01002 | D10023 | CREATE MODEL | model10 | 31 | U10002 | | |
| ... | ... | ... | ... | ... | ... | ... | ... |

FIG. 10A

| FACTOR ID | ERROR FACTOR |
|---|---|
| C0001 | FRESHNESS DEFICIENCY |
| C0002 | NO ACCESS RIGHT |
| C0003 | ACCURACY INCONSISTENCY |
| C0004 | NO CORRESPONDING FIELD |
| C0005 | NO CORRESPONDING PURPOSE |
| C0006 | NO CORRESPONDING KEYWORD RESULT |
| ⋮ | ⋮ |

FIG. 10B

| AVOIDANCE ID | FACTOR ID | AVOIDANCE POSSIBILITY | MEANS |
|---|---|---|---|
| A0001 | C0001 | IMPOSSIBLE | |
| A0001 | C0002 | POSSIBLE | ACQUIRE ACCESS RIGHT TO DUPLICATION SOURCE DATA OF CORRESPONDING DATA |
| A0001 | C0006 | IMPOSSIBLE | |
| ⋮ | ⋮ | ⋮ | ⋮ |

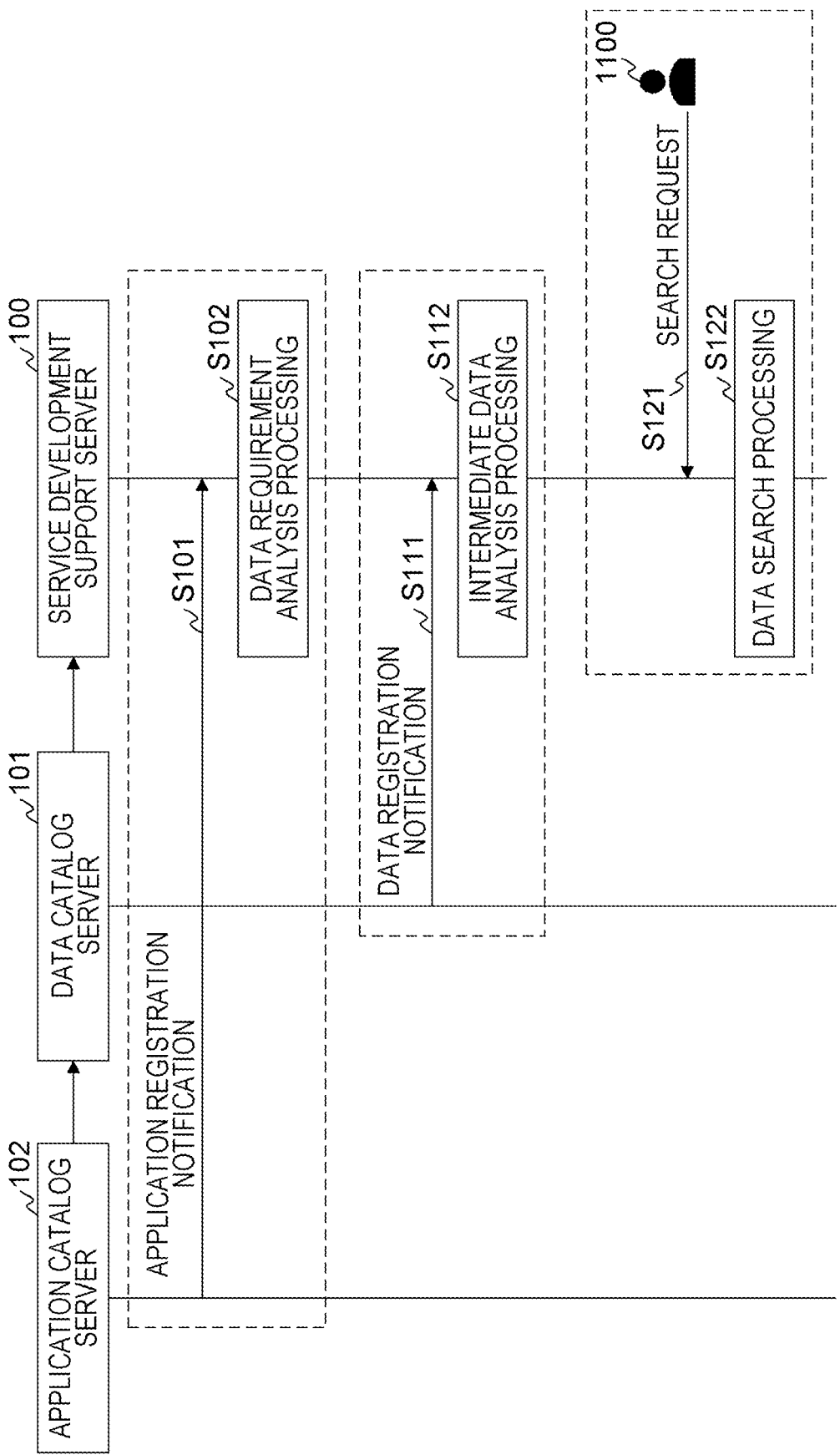

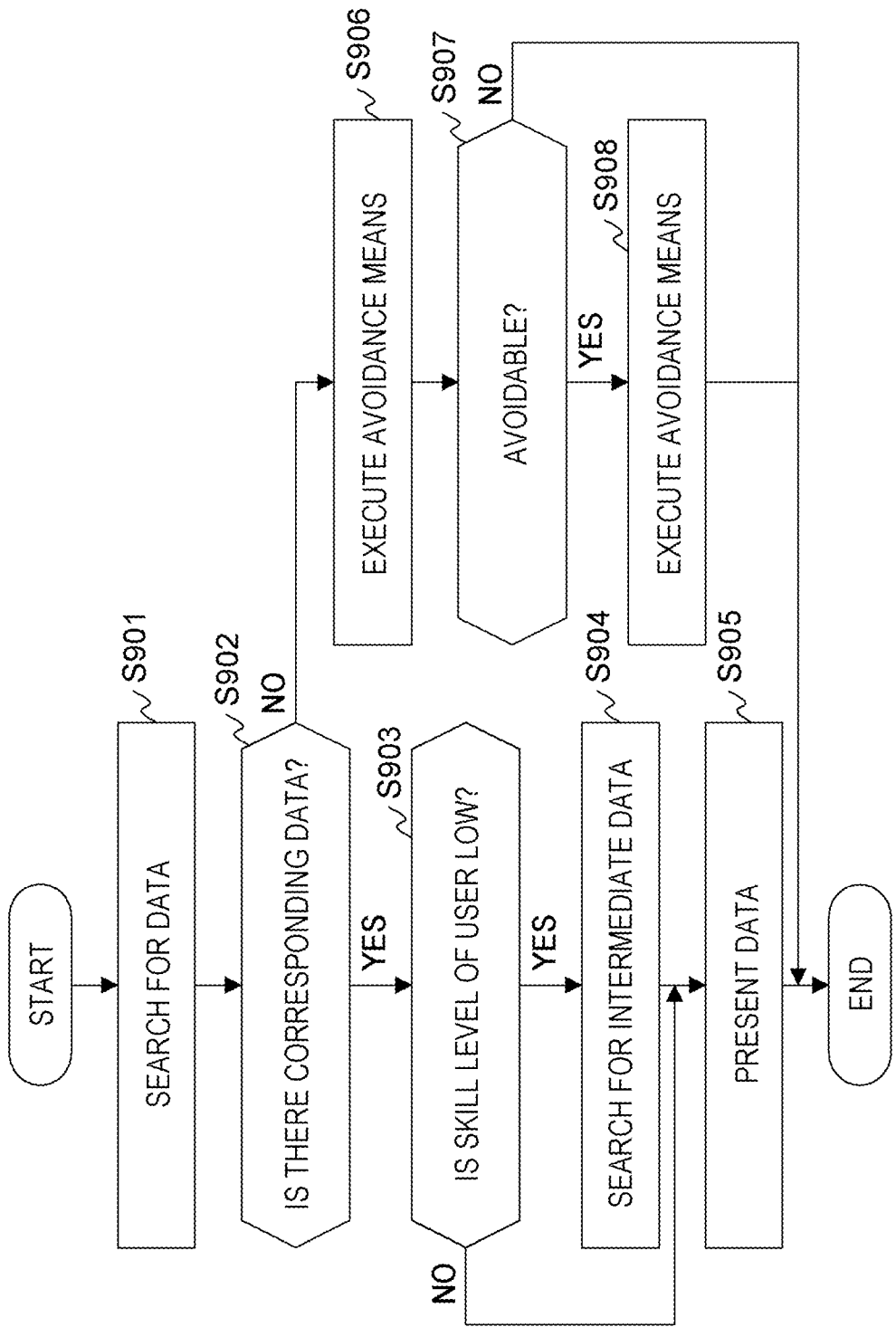

COMPUTER SYSTEM AND DATA PROVIDING METHOD

CLAIM OF PRIORITY

The present application claims priority from Japanese patent application JP 2023-029630 filed on Feb. 28, 2023, the content of which is hereby incorporated by reference into this application.

BACKGROUND OF THE INVENTION

1. Field of the Invention

The present invention relates to a technology for providing data used for development and operation of an application.

2. Description of the Related Art

In recent years, because of a shortage of DX human resources, as the number of cases where employees of an organization develop services has increased. By using data catalogs and application catalogs, it is possible to efficiently develop and operate services. Hereinafter, people who develop and operate services are referred to as users.

Users can search for data with reference to data catalogs. However, requirements of necessary data differ for each phase of life cycles of applications. When skill levels of users are low, it is difficult to efficiently develop and operate applications because the users do not have knowledge of data requirements for each phase.

On the other hand, a technique described in JP 2009-295008 A is known. JP 2009-295008 A describes that "a document management device receives a search keyword input by a user and a user attribute of the user, and searches for document information based on the received search keyword. Then, a project to which the user belongs is detected based on the received user attribute, a phase of the detected project is acquired from the project management device, and document information in which the number of operations is equal to or greater than a threshold value is extracted from the searched document information in the acquired phase of the project. Finally, the searched document information and the extracted document information are output to be provided to the user".

SUMMARY OF THE INVENTION

The technique described in JP 2009-295008 A is a technique for searching for a document, and does not perform processing in consideration of document requirements in a phase. Therefore, even if the technology described in JP 2009-295008 A is used, data according to the data requirement for each phase cannot be acquired.

The present invention implements a system that provides a user with data according to a phase of a life cycle of an application.

A representative example of the present invention disclosed in the present application is as follows. That is, a computer system connected to a database that stores a plurality of types of data is capable of accessing a data catalog that manages an item for searching for the data stored in the database: holds data requirement management information for managing requirement data associated with a phase of a life cycle of an application and a data requirement; searches for data matching a search condition from the data stored in the database with reference to the data catalog and presents the data to a user when a search request including the search condition is received; specifies the requirement data corresponding to the phase included in the output request with reference to the data requirement management information when an output request including information of data selected by the user and the phase is received; and outputs use data to be used in the phase included in the output request based on the selected data and the specified requirement data.

According to the present invention, data according to a phase of a life cycle of an application can be provided to a user. Problems, configurations, and effects other than those described above will be clarified by the following description of embodiments.

BRIEF DESCRIPTION OF THE DRAWINGS

FIG. 4 is a diagram illustrating an example of a data catalog according to the first embodiment;

FIG. 5 is a diagram illustrating an example of an application catalog according to the first embodiment;

FIG. 6 is a diagram illustrating an example of user management information according to the first embodiment;

FIG. 7 is a diagram illustrating an example of operation log management information according to the first embodiment;

FIG. 8 is a diagram illustrating an example of data requirement management information according to the first embodiment;

FIG. 9 is a diagram illustrating an example of intermediate data management information according to the first embodiment;

FIG. 10A is a diagram illustrating an example of intermediate data management information according to the first embodiment and a diagram illustrating an example of error handling information according to the first embodiment;

FIG. 10B is a diagram illustrating an example of intermediate data management information according to the first embodiment and a diagram illustrating an example of the error handling information according to the first embodiment;

FIG. 11 is a sequence diagram illustrating an outline of processing in the system according to the first embodiment;

FIG. 21 is a flowchart illustrating an example of data search processing executed by the service development support system according to the first embodiment.

DESCRIPTION OF THE PREFERRED EMBODIMENTS

Figure 1:
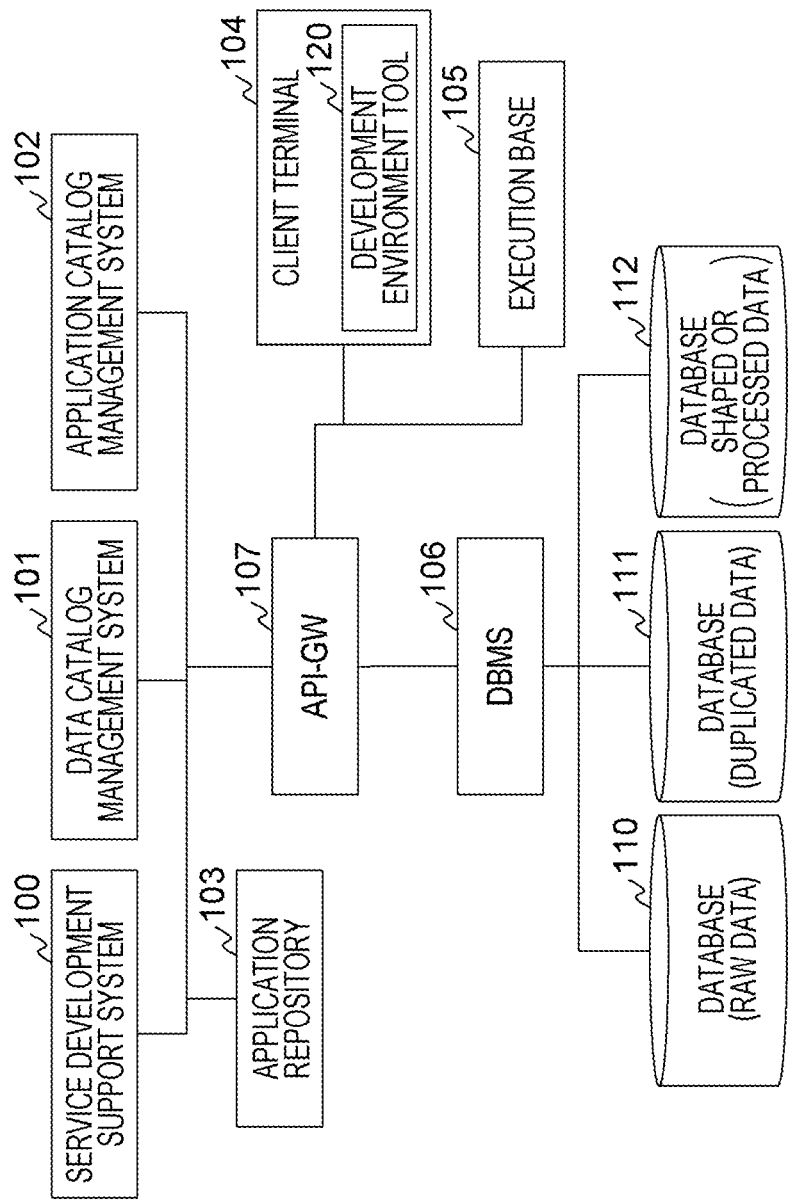
FIG. 1 is a diagram illustrating an example of a configuration of a system according to a first embodiment.

Hereinafter, embodiments of the present invention will be described with reference to the drawings. However, the present invention is not to be construed as being limited to the description of the following embodiments. Those skilled in the art can easily understand that the specific configuration can be changed without departing from the spirit or gist of the present invention.

In the configurations of the invention to be described below, the same or similar configurations or functions are denoted by the same reference numerals, and repeated description is omitted.

Notations such as "first", "second", and "third" in the present specification and the like are given to identify components, and do not necessarily limit numbers or orders.

The position, size, shape, range, and the like of each configuration illustrated in the drawings and the like may not represent the actual position, size, shape, range, and the like in order to facilitate understanding of the invention. Accordingly, the present invention is not limited to the positions, sizes, shapes, ranges, and the like disclosed in the drawings and the like.

First Embodiment

Figure 2:
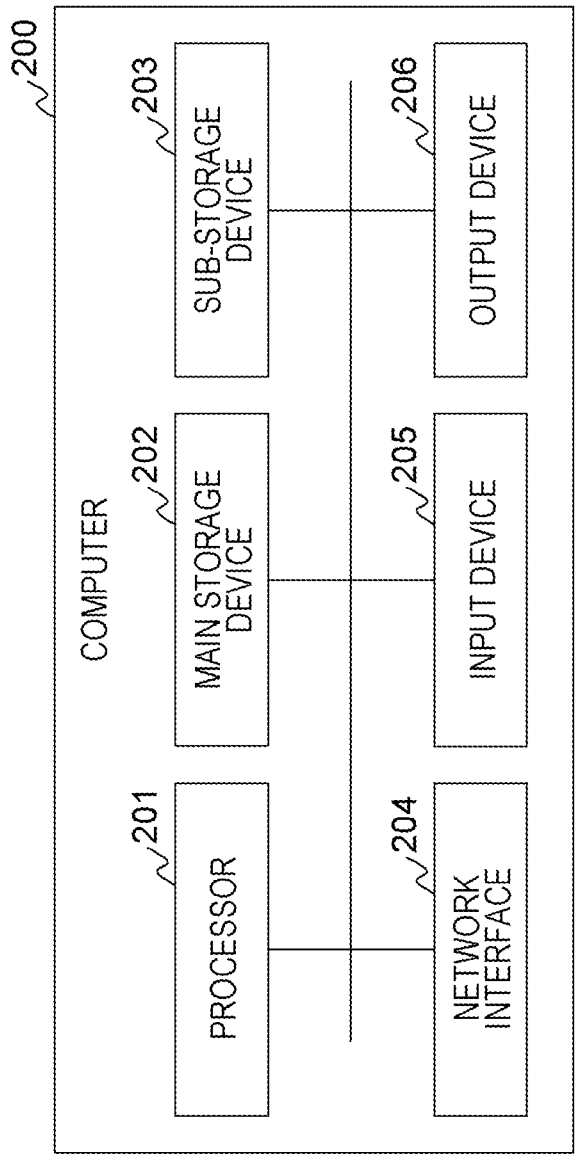
FIG. 2 is a diagram illustrating an example of a configuration of a computer according to the first embodiment.

FIG. 1 is a diagram illustrating an example of a configuration of a system according to a first embodiment. FIG. 2 is a diagram illustrating an example of a configuration of a computer according to the first embodiment.

The system according to the first embodiment includes a service development support system 100, a data catalog management system 101, an application catalog management system 102, an application repository 103, a client terminal 104, an execution base 105, an API-GW 107, and a DBMS 108. The configuration of the system illustrated in FIG. 1 is exemplary and a connection relationship between components and the number of components can be arbitrarily changed.

The client terminal 104 is a terminal that is operated by a user who develops and operates an application. The client terminal 104 includes a development environment tool 120 with which an application is developed and operated. The execution base 105 provides an environment in which an application is executed. In the execution base 105, a virtual machine, a container, or the like operates. The API-GW 107 calls an API for using an application, and the like.

The DBMS 106 manages the database. The DBMS 106 according to the first embodiment manages a database 110 that stores raw data handled by an application, a database 111 that stores duplicated data, and a database 112 that stores data obtained by shaping or processing the raw data or the duplicated data.

The data catalog management system 101 manages the data catalog 400 (see FIG. 4). The application catalog management system 102 manages an application catalog 500 (see FIG. 5). The application repository 103 stores a source code of the application.

The data catalog management system 101, the application catalog management system 102, the application repository 103, and the DBMS 106 hold operation logs. The client terminal 104 holds an operation log of the development environment tool 120. The execution base 105 holds a work log.

The service development support system 100 supports development and operation of an application that implements any service. The service development support system 100 according to the first embodiment provides data according to a phase of a life cycle of an application. The user can acquire data according to the phase of the life cycle of the application from the service development support system 100.

Each of the service development support system 100, the data catalog management system 101, the application catalog management system 102, and the execution base 105 is configured with, for example, a computer 200 as illustrated in FIG. 2.

The computer 200 includes a processor 201, a main storage device 202, a sub-storage device 203, a network interface 204, an input device 205, and an output device 206. The hardware elements are connected to each other via a bus 207. The computer 200 may not include the input device 205 and the output device 206.

The processor 201 executes a program stored in the main storage device 202. The processor 201 functions as a functional unit (module) by executing processing in accordance with the program. In the following description, when processing is described using a functional unit as a subject, it is indicated that the processor 201 executes a program implementing the functional unit.

The main storage device 202 is a memory or the like and stores a program executed by the processor 201 and information used by the program. The main storage device 202 includes a work area temporarily used by the program.

The sub-storage device 203 is a hard disk drive (HDD), a solid state drive (SSD), or the like, and permanently stores a large amount of data. The program and information stored in the main storage device 202 may be stored in the sub-storage device 203. In this case, the processor 201 reads the program and information from the sub-storage device 203 and loads the program and information to the main storage device 202.

The network interface 204 communicates with an external device via a network. The input device 205 is a keyboard, a mouse, a touch panel, or the like. The output device 206 is a display or the like.

Figure 3:
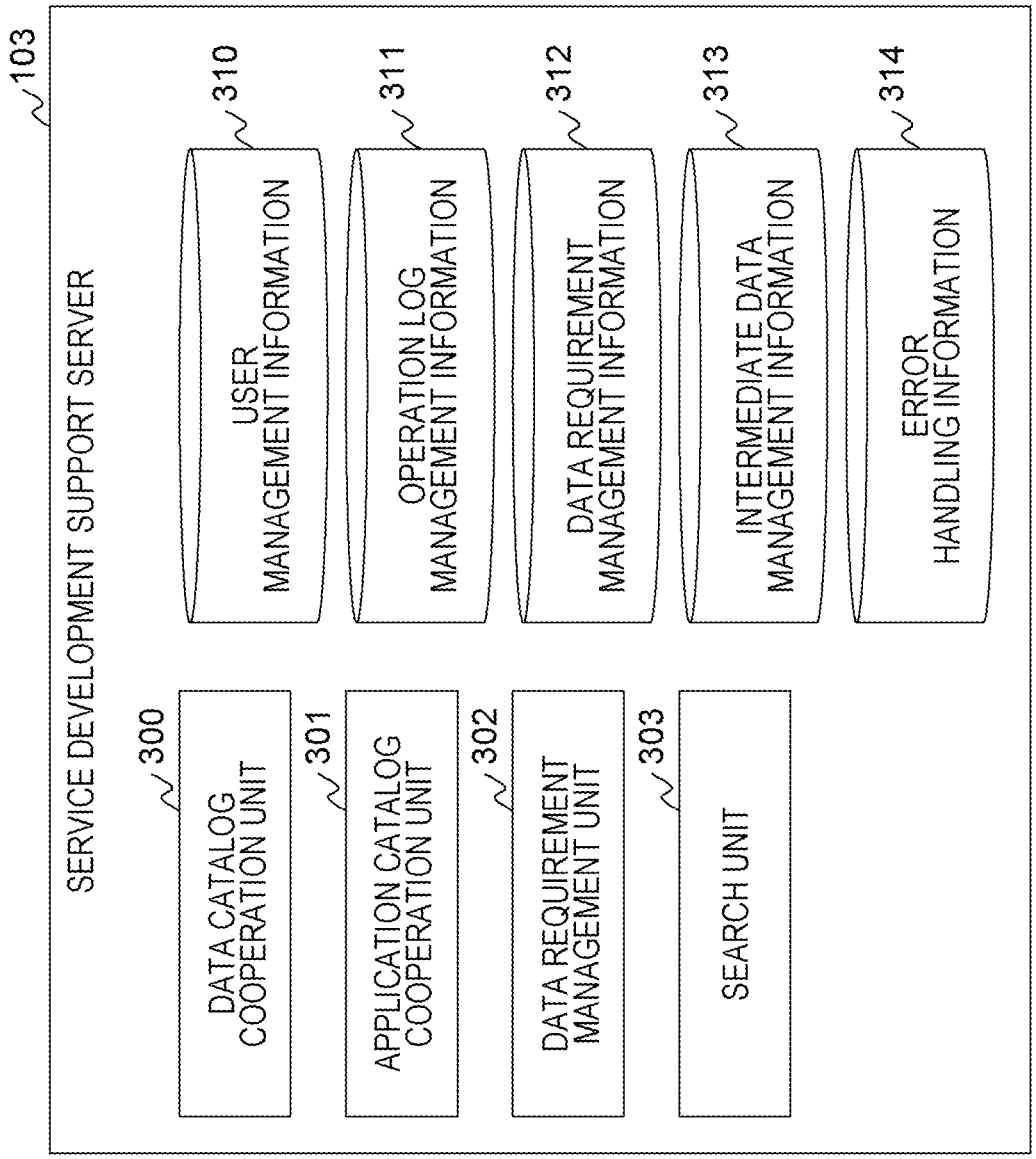
FIG. 3 is a diagram illustrating an example of a software configuration of a service development support system according to the first embodiment.

FIG. 3 is a diagram illustrating an example of a software configuration of the service development support system 100 according to the first embodiment.

The service development support system 100 includes a data catalog cooperation unit 300, an application catalog cooperation unit 301, a data requirement management unit 302, and a search unit 303. The service development support system 100 holds user management information 310, operation log management information 311, data requirement management information 312, intermediate data management information 313, and error handling information 314.

The user management information 310 is information for managing a user. Details of the user management information 310 will be described with reference to FIG. 6.

The operation log management information 311 is information for managing an operation log related to development and operation of an application. Details of the operation log management information 311 will be described with reference to FIG. 7.

The data requirement management information 312 is information for managing the data requirement for each phase of a life cycle of an application. Details of the data requirement management information 312 will be described with reference to FIG. 8.

The intermediate data management information 313 is information for managing intermediate data generated or used in development and operation of an application. Details of the intermediate data management information 313 will be described with reference to FIG. 9.

The error handling information 314 is information for managing a handling method for an error in search of data used for development and operation of an application. Details of the error handling information 314 will be described with reference to FIGS. 10A and 10B.

The data catalog cooperation unit 300 cooperates with the data catalog management system 101 to perform reference to the data catalog 400, record update, record acquisition, and the like. The application catalog cooperation unit 301 cooperates with the application catalog management system 102 to reference the application catalog 500, update a record, acquire a record, and the like.

The data requirement management unit 302 manages the data requirement management information 312. The search unit 303 provides data according to the phase of the life cycle of the application.

For each functional unit included in the service development support system 100, a plurality of functional units may be integrated into one functional unit, or one functional unit may be divided into a plurality of functional units.

FIG. 4 is a diagram illustrating an example of the data catalog 400 according to the first embodiment.

The data catalog 400 stores a record including a data ID 401, metadata 402, and a lineage 403. There is one record for one data. The fields included in the record are not limited to those described above. Any of the fields described above may not be included, and other fields may be included. For example, a field in which a name of data and quality of data are stored may be included.

The data ID 401 is a field in which an ID for identifying data is stored.

The metadata 402 is a field group in which metadata of data is stored. The metadata 402 includes, for example, a schema, a field and purpose of a service implemented by an application using data, an access right, a tag, a storage location, an owner, a registration date, an update date, and the number of uses. In the present embodiment, the metadata 402 includes at least the field and the purpose.

The lineage 403 is a field in which a lineage of data is stored. The lineage 403 may be included in the metadata 402.

FIG. 5 is a diagram illustrating an example of the application catalog 500 according to the first embodiment.

The application catalog 500 stores a record including an APP ID 501, metadata 502, and a parameter 503. There is one record for one application. The fields included in the record are not limited to those described above. Any of the fields described above may not be included, and other fields may be included. For example, a field in which a name of an application and information of a tool used for application development are stored may be included.

The APP ID 501 is a field in which an ID for identifying an application is stored.

The metadata 502 is a field group in which metadata of an application is stored. The metadata 502 includes, for example, a registrant, a registration date, a purpose, and a tag. In the present embodiment, it is assumed that the metadata 502 includes a purpose.

The parameter 503 is a field group in which information regarding a parameter of the application is stored. The parameter 503 includes, for example, a method, an input, a description, an output, and the number of uses.

FIG. 6 is a diagram illustrating an example of the user management information 310 according to the first embodiment.

The user management information 310 stores a record including a user ID 601, a user name 602, an affiliation 603, an attribute 604, and an environment 605. There is one record for one user. The fields included in the record are not limited to those described above. Any of the fields described above may not be included, and other fields may be included.

The user ID 601 is a field in which an ID for identifying a user is stored. The user name 602 is a field in which the name of the user is stored. The affiliation 603 is a field in which affiliation of the user is stored. The attribute 604 is a field in which a skill level of the user is stored. The environment 605 is a field group in which information regarding a development environment of the user is stored.

The skill level of the user may be determined based on a self-report of the user. The skill level of the user may be determined based on the number of pieces of registered data or applications, the number of uses of the registered data or applications, or the like. The skill level of the user may be determined based on a carrier of the user.

FIG. 7 is a diagram illustrating an example of the operation log management information 311 according to the first embodiment.

The operation log management information 311 stores a record including an APP ID 701, a field 702, a purpose 703, a phase 704, a start time 705, an end time 706, a DB name 707, and a query 708. There is one entry for a combination of an application and a phase. The fields included in the record are not limited to those described above. Any of the fields described above may not be included, and other fields may be included.

APP ID 701 is the same field as APP ID 501. The field 702 and the purpose 703 are fields in which a field and a purpose of a service realized by an application are stored.

The phase 704 is a field in which a phase of a life cycle of the application is stored. The start time 705 and the end time 706 are fields in which a start time and an end time of a period according to a phase are stored.

The DB name 707 is a field in which a name of a use database is stored. The query 708 is a field group in which content of a query used at the time of development and operation is stored. The query 708 includes a query statement, access information, and a condition.

FIG. 8 is a diagram illustrating an example of the data requirement management information 312 according to the first embodiment.

The data requirement management information 312 stores a record including an ID 801, a field 802, a purpose 803, a phase 804, a data requirement 805, and the number of uses 806. The fields included in the record are not limited to those described above. Any of the fields described above may not be included, and other fields may be included.

The ID 801 is a field in which an ID for identifying a record is stored.

The field 802 and the purpose 803 are fields in which a field and a purpose of a service implemented by an application are stored. The phase 804 is a field in which a phase of a life cycle of the application is stored.

The data requirement 805 is a field group in which a data requirement of data used for development/operation of an application corresponding to a combination of a field, a purpose, and a phase is stored. The data requirement 805 includes, for example, a data amount, reference data, example data, and the like. The number of uses 806 is a field in which the number of uses of the data requirement is stored.

FIG. 9 is a diagram illustrating an example of the intermediate data management information 313 according to the first embodiment.

The intermediate data management information 313 stores a record including an ID 901, input data 902, processing 903, output data 904, the number of uses 905, a registrant 906, and catalog registration 907. A record is generated using a lineage of data. The fields included in the record are not limited to those described above. Any of the fields described above may not be included, and other fields may be included.

The ID 901 is a field in which an ID for identifying a record is stored.

The input data 902, the processing 903, and the output data 904 are fields in which input data, processing, and output data in processing for generating new data using data are stored. The number of uses 905 is a field in which the number of uses of processing is stored. In the input data 902 and the output data 904, a temporary data ID is assigned to intermediate data that is not registered in the data catalog 400.

The registrant 906 is a field in which a registrant of data using the lineage is stored. The catalog registration 907 is a field in which registration information of the intermediate data in the data catalog 400 is stored. When the intermediate data is registered in the data catalog 400, the temporary data ID and the data ID of the intermediate data are stored in the catalog registration 907.

FIGS. 10A and 10B are diagrams illustrating examples of the error handling information 314 according to the first embodiment.

The error handling information 314 includes tables 1000 and 1010. The table 1000 is a table for managing error factors. The table 1010 is a table for managing a target method according to the error factors.

The table 1000 stores a record including factor ID 1001 and error factor 1002. There is one record for one error factor. The fields included in the record are not limited to those described above.

The factor ID 1001 is a field in which an ID for identifying an error factor is stored. The error factor 1002 is a field in which an error factor is stored.

The table 1010 stores a record including an avoidance ID 1011, a factor ID 1012, an avoidance possibility 1013, and a means 1014. There is one record for single avoidance means. The fields included in the record are not limited to those described above.

The avoidance ID 1011 is a field in which an ID for identifying avoidance means is stored. The factor ID 1012 is a field in which an ID of an error factor to which the avoidance means is applied is stored. The avoidance possibility 1013 is a field in which a flag indicating whether an error can be avoided is stored. The means 1014 is a field in which the avoidance means is stored. The means 1014 of the record in which the avoidance possibility 1013 is "impossible" is blank.

FIG. 11 is a sequence diagram illustrating an outline of processing in the system according to the first embodiment. In the system according to the first embodiment, three types of processing are executed. The three types of processing are independent of each other.

(Processing 1) When an application registration notification is received from the application catalog management system 102 (step S101), the service development support system 100 executes data requirement analysis processing (step S102). This is performed to analyze and accumulate data requirements of data used for development/operation of an application registered by a user who has a high skill level.

(Processing 2) When the data registration notification is received from the data catalog management system 101 (step S111), the service development support system 100 executes intermediate data analysis processing (step S112). This is performed to identify intermediate data related to data registered by a user who has a high skill level. An object is to facilitate data acquisition by registering intermediate data with a large number of uses in the data catalog 400.

(Processing 3) When a data search request is received from the user 1100 (step S121), the service development support system 100 executes data search processing (step S122). This is performed to provide data used for development/operation of an application.

Details of the three types of processing will be described below.

Figure 12:
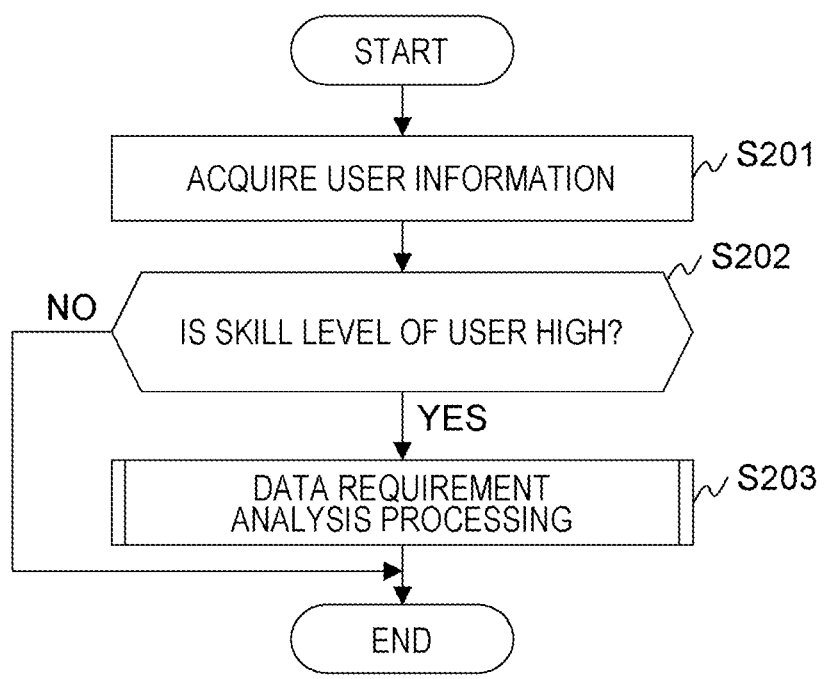
FIG. 12 is a flowchart illustrating an example of processing executed when the service development support system according to the first embodiment receives an application registration notification.

First, processing 1 will be described. FIG. 12 is a flowchart illustrating an example of processing executed when the service development support system 100 according to the first embodiment receives an application registration notification.

The service development support system 100 acquires information regarding the user who has registered the application (step S201). Hereinafter, the registered application is referred to as a target application, and the user who has registered the application is referred to as a target user.

Specifically, the service development support system 100 acquires a user ID, a name, and the like of the target user from the metadata 502 of a record of a target application with reference to the application catalog 500.

The service development support system 100 determines whether a skill level of the target user is high (step S202).

Specifically, the service development support system 100 acquires a value of the skill level from the attribute 604 of the record of the target user with reference to the user management information 310. The application catalog cooperation unit 301 determines whether the skill level of the target user is high based on the value. It is assumed that the level of the skill level is determined on a rule basis.

When the skill level of the target user is low, the service development support system 100 ends the processing.

When the skill level of the target user is high, the service development support system 100 executes data requirement analysis processing (step S203), and then ends the processing.

Figure 13:
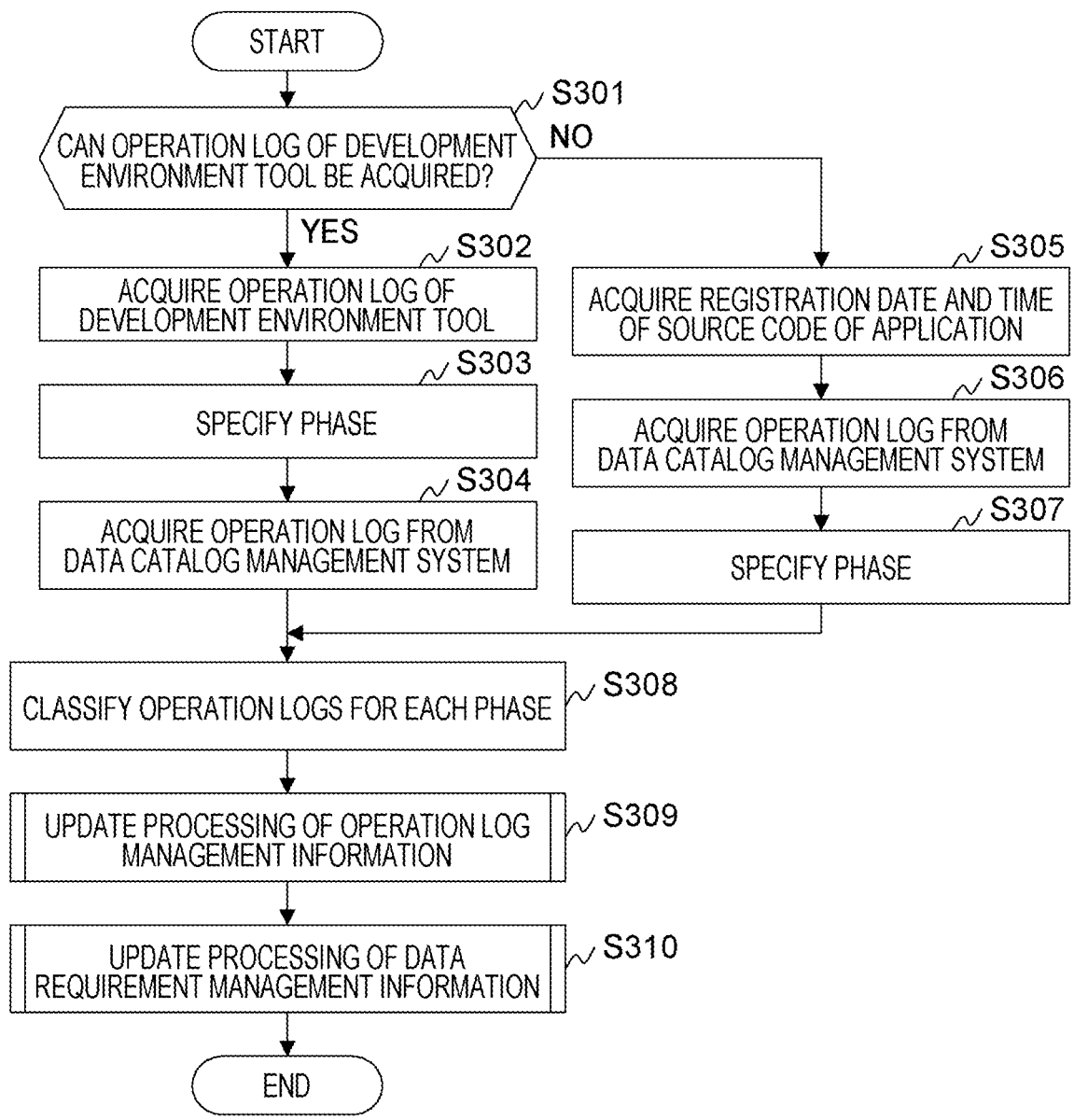
FIG. 13 is a flowchart illustrating an example of data requirement analysis processing executed by the service development support system according to the first embodiment.

FIG. 13 is a flowchart illustrating an example of data requirement analysis processing executed by the service development support system 100 according to the first embodiment.

The service development support system 100 determines whether an operation log of the development environment tool 120 used by the target user can be acquired (step S301). For example, the service development support system 100 transmits an acquisition request to the client terminal 104 and determines whether acquisition is permitted.

When the operation log of the development environment tool 120 can be acquired, the service development support system 100 acquires the operation log (step S302), and specifies a phase using the acquired operation log (step S303).

For example, the service development support system 100 specifies a start time of the phase "operation" from the operation log related to the deployment, and specifies a period of a phase "integration test" based on the operation log before the specified time. The service development support system 100 specifies the period of the phase "unit test" based on the operation log before the start time of the phase "integration test".

The service development support system 100 acquires an operation log of each phase related to the target user from the data catalog management system 101 (step S304). Thereafter, the service development support system 100 moves to step S308.

Specifically, the service development support system 100 acquires the specified operation log of each phase and the operation log before the period of the phase "unit test" from the data catalog management system 101.

When it is determined in step S301 that the operation log of the development environment tool 120 cannot be acquired, the service development support system 100 acquires a registration date and time of a source code of the target application from the application repository 103 (step S305).

The service development support system 100 acquires, from the data catalog management system 101, an operation log before the registration date and time of the source code of the target application related to the target user and an operation log before the registration date and time of the target application related to the target user (step S306).

The service development support system 100 specifies a phase based on the acquired operation log and the work log of the target application that can be acquired from the execution base 105 (step S307). Thereafter, the service development support system 100 moves to step S308.

The service development support system 100 extracts operation logs of accesses to the databases 110, 111, and 112 from the operation logs acquired from the data catalog management system 101, and classifies the operation log for each phase (step S308).

The service development support system 100 executes update processing for the operation log management information 311 (step S309).

The service development support system 100 executes update processing for the data requirement management information 312 (step S310), and then ends the data requirement analysis processing.

Figure 14:
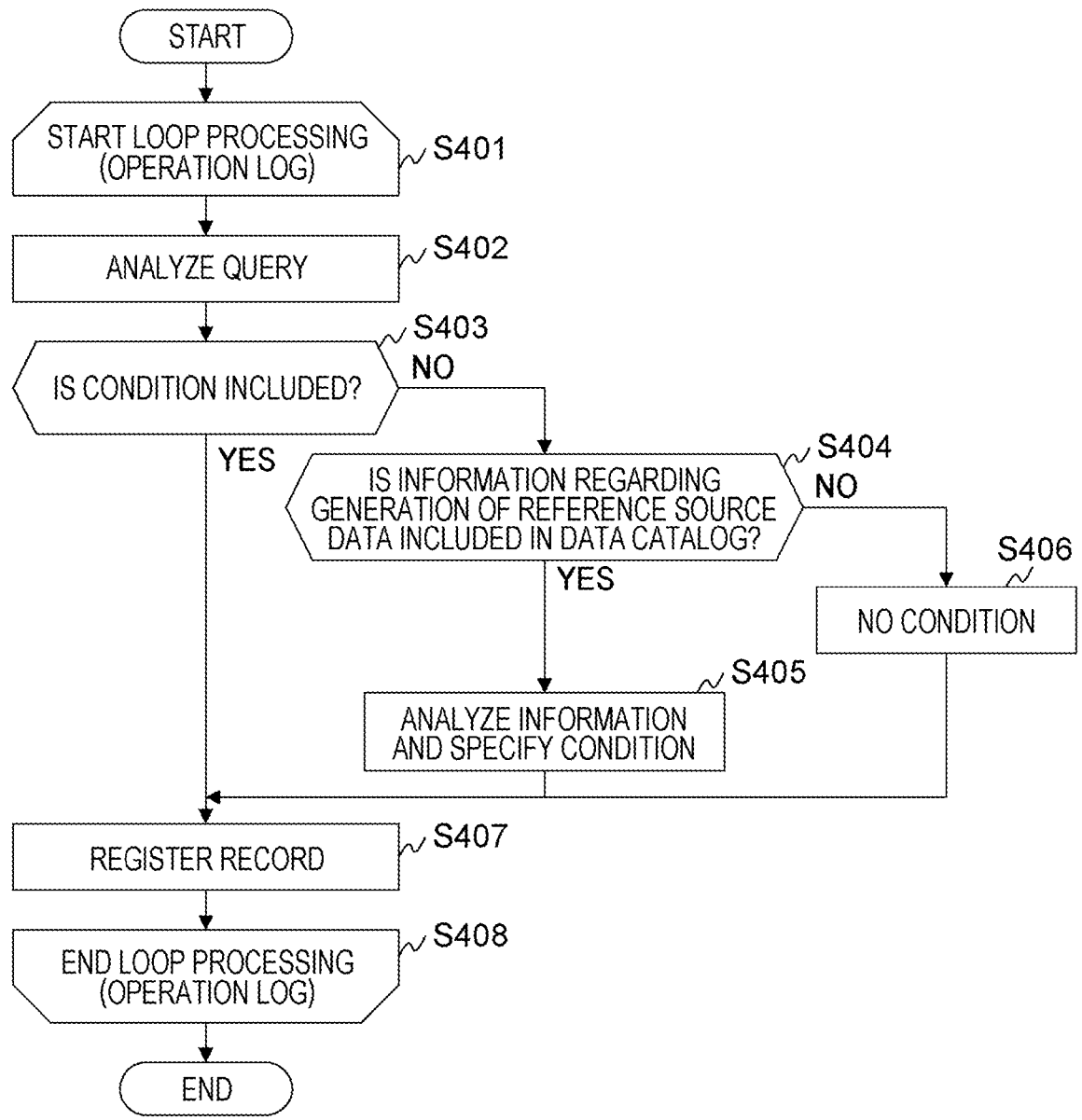
FIG. 14 is a flowchart illustrating an example of operation log management information update processing executed by the service development support system according to the first embodiment.

FIG. 14 is a flowchart illustrating an example of update processing of the operation log management information 311 executed by the service development support system 100 according to the first embodiment.

The service development support system 100 starts loop processing for the operation log (step S401).

The service development support system 100 analyzes a query included in the operation log (step S402), and determines whether a condition is included in the query (step S403). For example, if a WHERE clause is included, it is determined that a condition is included.

When the query includes a condition, the service development support system 100 moves to step S407.

When no condition is included in the query, the service development support system 100 determines whether information regarding generation of reference source data is included in the data catalog 400 (step S404).

When the data catalog 400 includes the information regarding the generation of the reference source data, the service development support system 100 analyzes the information and sets an analysis result as a condition (step S405). Thereafter, the service development support system 100 moves to step S407.

When the data catalog 400 does not include the information regarding the generation of the reference source data, the service development support system 100 sets absence of the condition (step S406). Thereafter, the service development support system 100 moves to step S407.

In step S407, the service development support system 100 adds a record to the operation log management information 311 (step S407).

Specifically, the service development support system 100 adds a record to the operation log management information 311, sets an ID of the target application in the APP ID 701 of the record, and sets a field and a purpose of the target application in the field 702 and the purpose 703. The service development support system 100 sets information regarding a phase corresponding to the operation log in the phase 704, the start time 705, and the end time 706 of the added record. The service development support system 100 sets a name of a database that has accessed the DB name 707 of the added record, and sets query information in the query 708. Any one of a condition included in the query, an analysis result, and the absence of the condition is set in the field of the condition included in the query 708.

The service development support system 100 determines whether the processing has been completed on all the operation logs (step S408).

When the processing has not been completed on all the operation logs, the service development support system 100 returns to step S401 and executes similar processing.

When the processing has been completed on all the operation logs, the service development support system 100 ends the update processing for the operation log management information 311.

Figure 15:
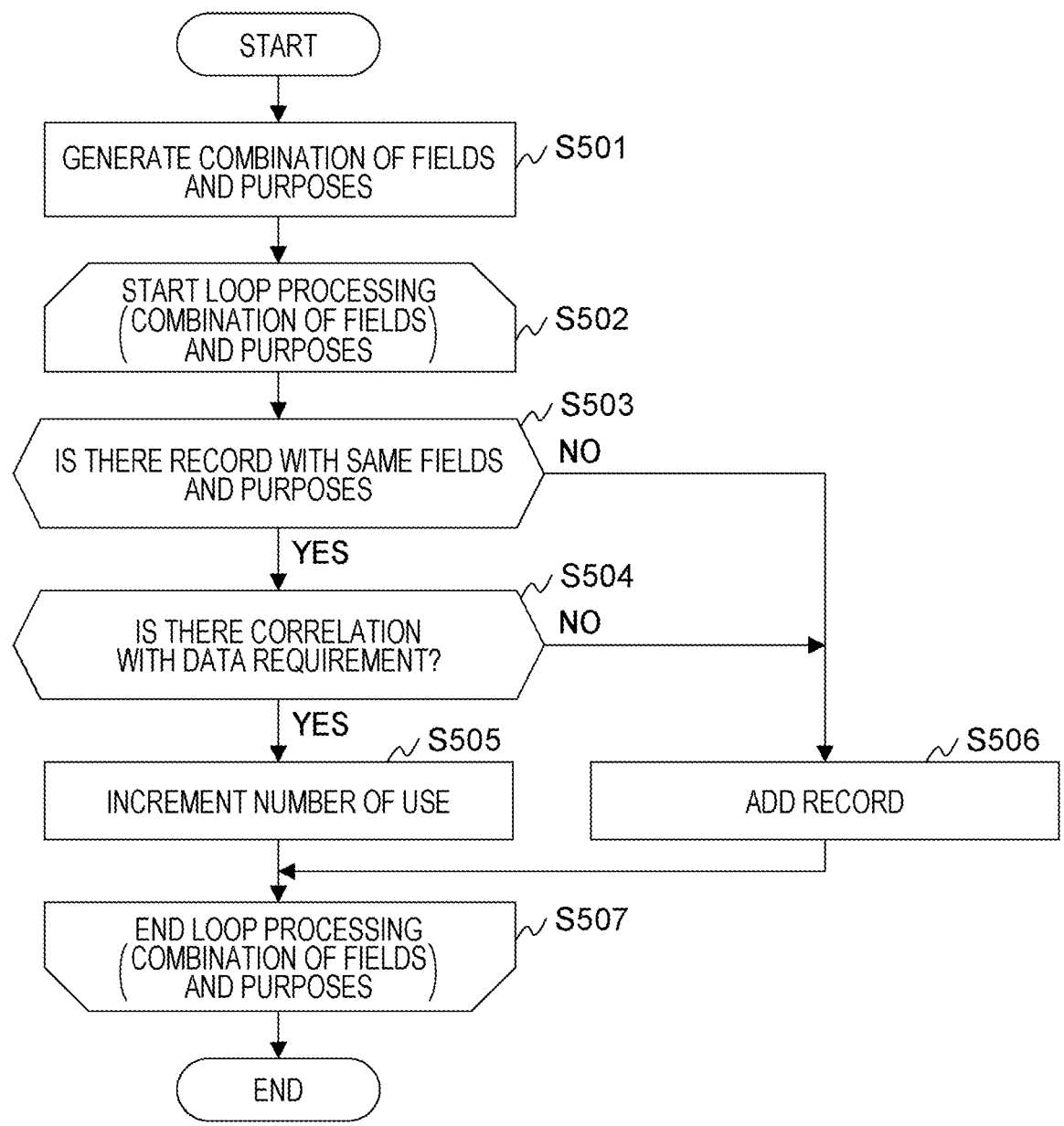
FIG. 15 is a flowchart illustrating an example of data requirement management information update processing executed by the service development support system according to the first embodiment.

FIG. 15 is a flowchart illustrating an example of update processing for the data requirement management information 312 executed by the service development support system 100 according to the first embodiment.

The service development support system 100 generates combinations of fields and purposes (step S501).

The service development support system 100 starts loop processing for a combination of the fields and the purposes (step S502).

The service development support system 100 determines whether there is a record in which combinations of fields and purposes are the same in the data requirement management information 312 (step S503).

If there is no record in which the combinations of the fields and the purposes are the same, the service development support system 100 moves to step S506.

When there is a record in which the combinations of the fields and the purposes are the same, the service development support system 100 determines whether there is a correlation between the data requirement extracted from the operation log corresponding to the combinations of the fields and the purposes and the data requirement of the record (step S504).

For example, when the phase of the operation log and the reference data included in the operation log are the same as the values included in the record, it is determined that there is the correlation in the data requirement.

The data requirement is extracted as follows, for example. The service development support system 100 acquires the number of data lines from the operation log, and extracts the number of pieces of generated data lines as a data requirement. When a data copy is acquired from the operation log, the service development support system 100 extracts a snapshot as a data requirement. When a data reference range is acquired from the operation log, the service development support system 100 extracts the data reference range as a data requirement. The above-described extraction method is exemplary and the extraction method is not limited thereto.

When there is the correlation, the service development support system 100 increments a value of the number of uses 806 of the record (step S505) and moves to step S507.

When there is no correlation, the service development support system 100 moves to step S506.

In step S506, the service development support system 100 adds a record to the data requirement management information 312 based on the data requirement extracted from the operation log corresponding to the combination of the field and the purpose (step S506). Thereafter, the service development support system 100 moves to step S507.

In step S507, the service development support system 100 determines whether the processing has been completed on all the combinations of the fields and the purposes (step S507).

When the processing has not been completed on all combinations of the fields and the purposes, the service development support system 100 returns to step S502.

When the processing has been completed on all the combinations of the fields and the purposes, the service development support system 100 ends the update processing for the data requirement management information 312.

Figure 16:
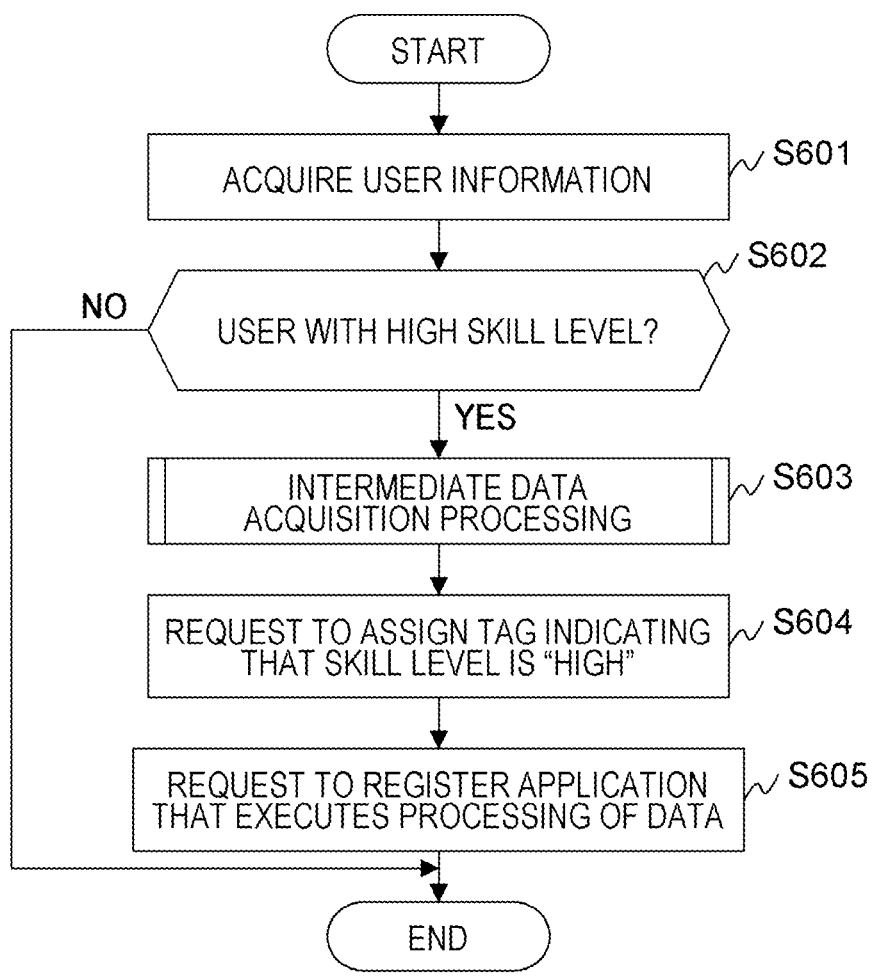
FIG. 16 is a flowchart illustrating an example of processing executed when the service development support system according to the first embodiment receives a data registration notification.

Next, processing 2 will be described. FIG. 16 is a flowchart illustrating an example of processing executed when the service development support system 100 according to the first embodiment receives a data registration notification.

The service development support system 100 acquires information regarding a user who has registered the data (step S601). Hereinafter, the registered data is referred to as target data, and the user who has registered the data is referred to as a target user.

Specifically, the service development support system 100 acquires a user ID, a name, and the like of the target user from the metadata 402 of a record of the target data with reference to the data catalog 400.

The service development support system 100 determines whether the skill level of the target user is high (step S602). The processing of step S602 is the same as the processing of step S202.

When the skill level of the target user is low, the service development support system 100 ends the processing. When the skill level of the target user is high, the service development support system 100 executes intermediate data analysis processing (step S603).

The service development support system 100 requests the data catalog management system 101 to assign a tag indicating that the skill level is high to the target data (step S604).

The service development support system 100 requests the application catalog management system 102 to register an application that executes processing for the target data (step S605), and then ends the processing.

Figure 17:
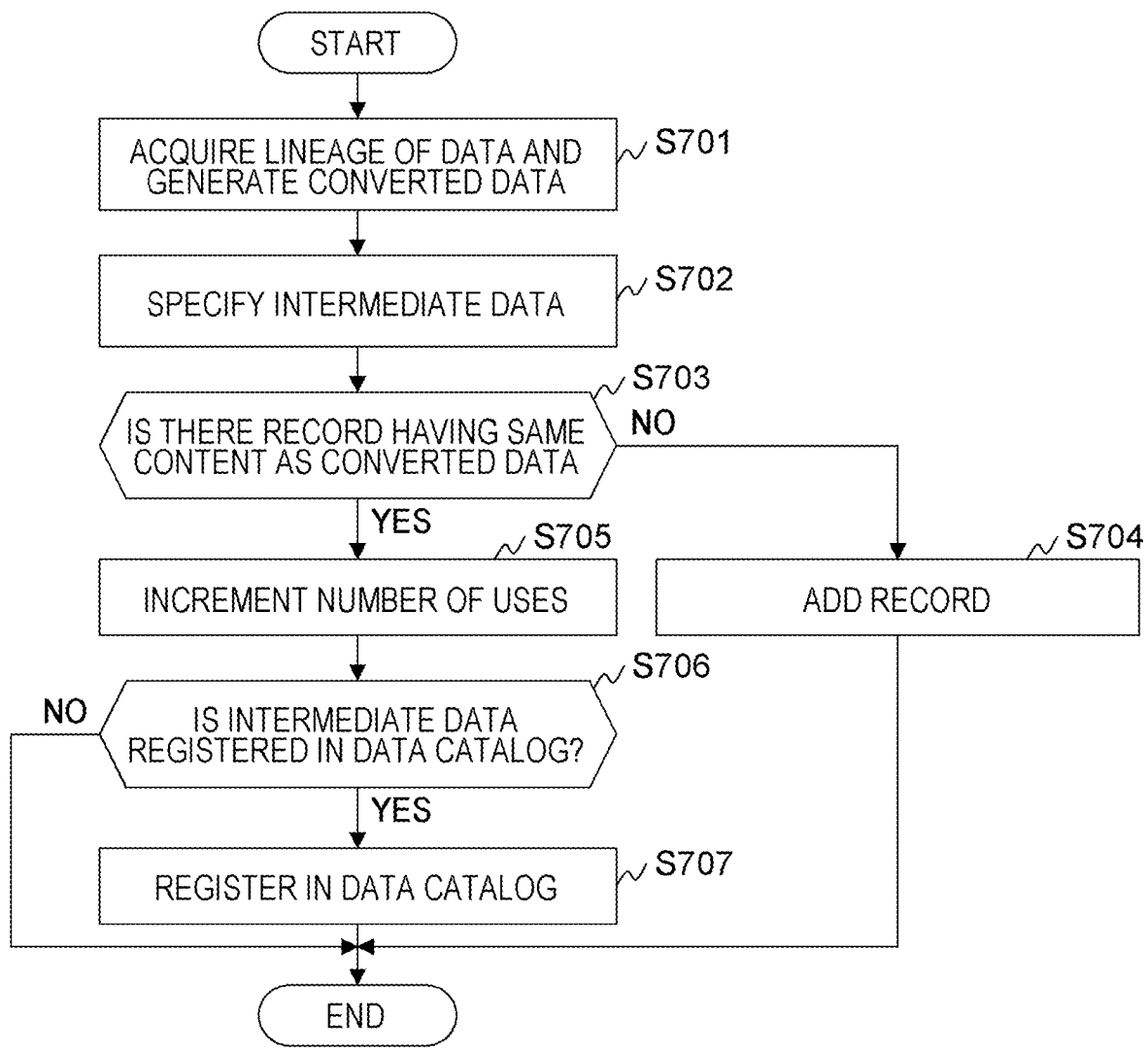
FIG. 17 is a flowchart illustrating an example of intermediate data analysis processing executed by the service development support system according to the first embodiment.

FIG. 17 is a flowchart illustrating an example of intermediate data analysis processing executed by the service development support system 100 according to the first embodiment.

The service development support system 100 acquires the lineage of the target data from the data catalog 400 and generates converted data by executing data conversion (step S701).

Specifically, the service development support system 100 generates the converted data having input data, processing, and output data as items.

The service development support system 100 analyzes the converted data and specifies intermediate data not registered in the data catalog 400 based on the analysis result with reference to the data catalog 400 (step S702). At this time, the service development support system 100 assigns a temporary data ID to the specified intermediate data.

When the converted data includes only information regarding the processing, the data output as a processing result is intermediate data.

The service development support system 100 determines whether there is a record having the same content as the converted data with reference to the intermediate data management information 313 (step S703).

Specifically, it is determined whether there is a record in which combinations of values of the input data 902, the processing 903, and the output data 904 are the same as combinations of values included in the converted data.

If there is no record having the same content as the converted data, the service development support system 100 adds a record to the intermediate data management information 313 (step S704), and then ends the intermediate data analysis processing.

Specifically, the service development support system 100 adds a record to the intermediate data management information 313 and sets an ID in the ID 901 of the record. The service development support system 100 sets values to the input data 902, the processing 903, and the output data 904 of the added record based on the converted data. The service development support system 100 sets 1 to the number of uses 905 of the added record.

When there is a record having the same content as the converted data, the service development support system 100 increments the number of uses 905 of the record (step S705).

The service development support system 100 determines whether the intermediate data is registered in the data catalog 400 (step S706).

Specifically, the service development support system 100 determines whether the value of the number of uses 905 of the record is greater than a threshold value. When the value of the number of uses 905 of the record is greater than the threshold value, the service development support system 100 determines to register the intermediate data corresponding to the record.

When the intermediate data is not registered in the data catalog 400, the service development support system 100 ends the intermediate data analysis processing.

When the intermediate data is registered in the data catalog 400, the service development support system 100 requests the data catalog management system 101 to register the intermediate data (step S707), and then ends the intermediate data analysis processing. The service development support system 100 acquires the data ID assigned to the intermediate data from the data catalog management system 101 and sets a set of the temporary data ID and the data ID in the catalog registration 907 of the record.

Figure 18:
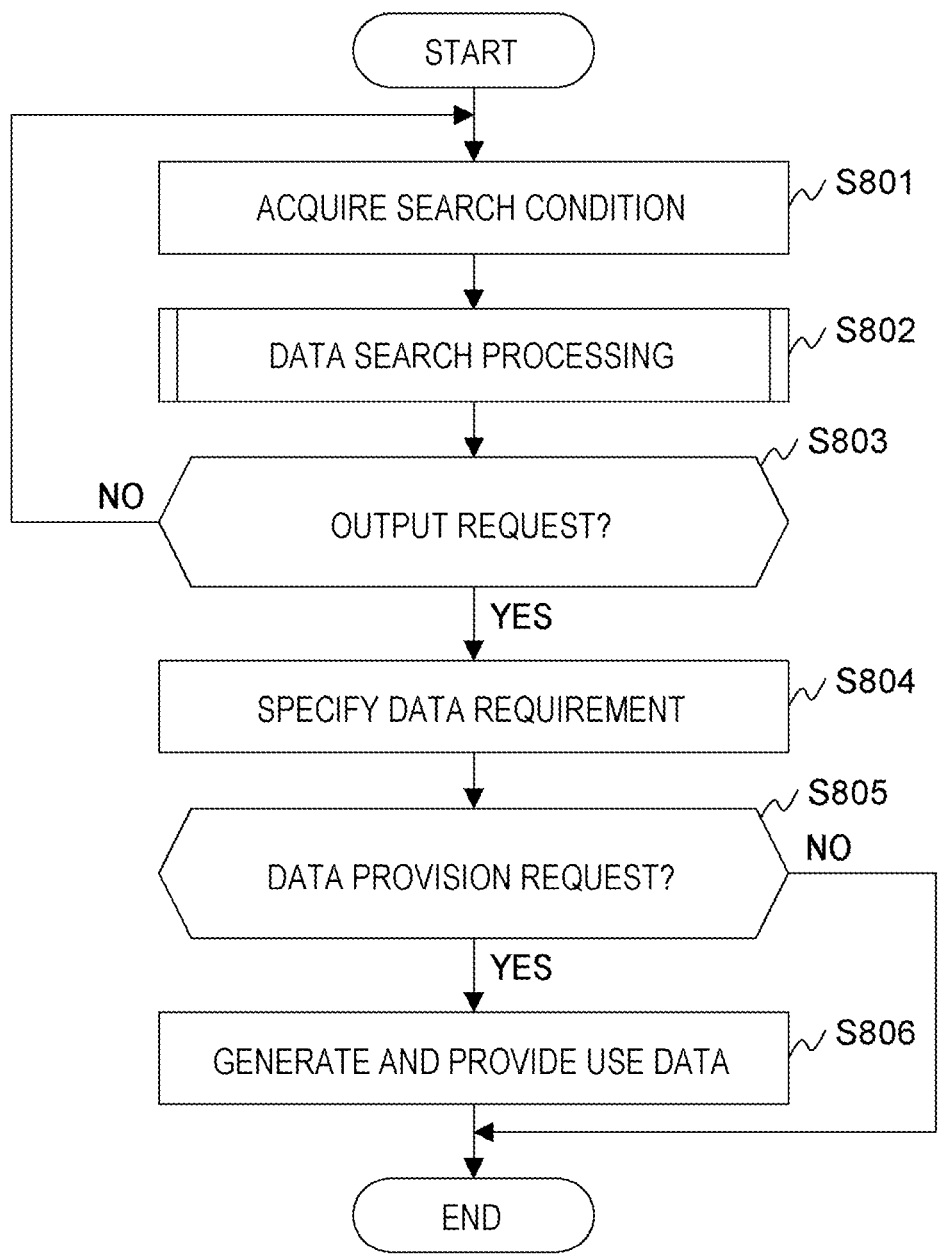
FIG. 18 is a flowchart illustrating an example of processing executed when the service development support system according to the first embodiment receives a data search request.
Figure 19:
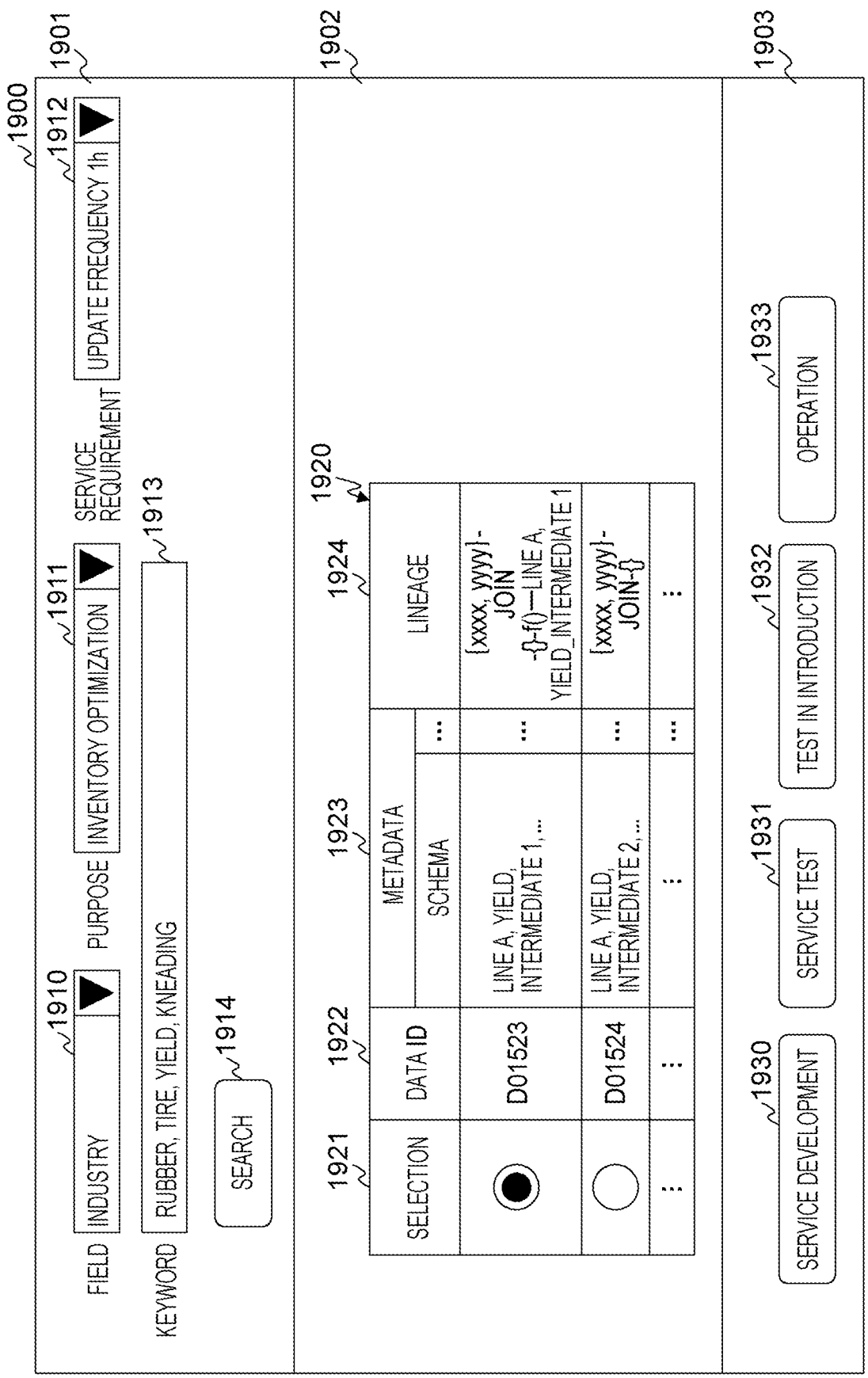
FIG. 19 is a diagram illustrating an example of a screen presented by the service development support system according to the first embodiment.
Figure 20:
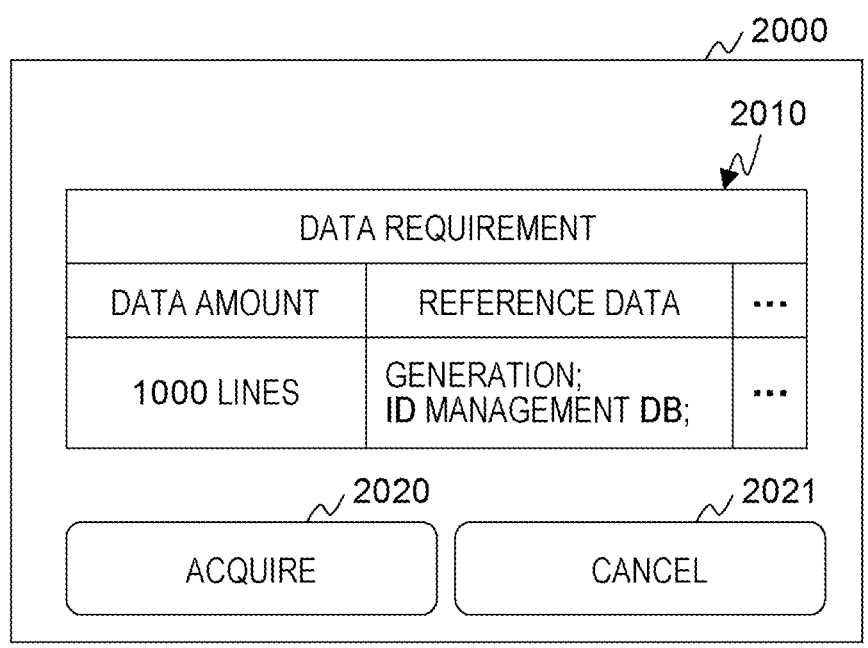
FIG. 20 is a diagram illustrating an example of a screen presented by the service development support system according to the first embodiment.

Next, processing 3 will be described. FIG. 18 is a flowchart illustrating an example of processing executed when the service development support system 100 according to the first embodiment receives a data search request. FIGS. 19 and 20 are diagrams illustrating an example of a screen presented by the service development support system 100 according to the first embodiment.

When the data search request is received, the service development support system 100 presents a screen 1900 illustrated in FIG. 19. The screen 1900 includes an input region 1901, a display region 1902, and a selection region 1903.

The input region 1901 is a region where a data search condition is input and includes input fields 1910, 1911, 1912, and 1913, and a search button 1914. The input field 1910 is a field in which a field of a service is input. The input field 1911 is a field in which a purpose of the service is input. The input field 1912 is a field in which a requirement of the service is input. The requirement of the service is a requirement included in the metadata 402. The input field 1913 is a field in which a keyword such as a field name of the data or a value included in the data used for searching data is input. The search button 1914 is an operation button with which an instruction to execute search is given.

When the user operates the search button 1914, a search execution request including values input in the input fields 1910, 1911, 1912, and 1913 is transmitted to the service development support system 100.

The display region 1902 is a region where a search result is displayed. In the display region 1902, a table 1920 for displaying data satisfying the search condition input via the input region 1901 is displayed. The table 1920 stores a record including a selection 1921, a data ID 1922, metadata 1923, and a lineage 1924. The data ID 1922, the metadata 1923, and the lineage 1924 are the same fields as the data ID 401, the metadata 402, and the lineage 403. The selection 1921 is a region where a radio button with which data for generating data used for development/operation of an application is selected is displayed.

The selection region 1903 is a region where a phase of a life cycle of the application is selected and includes phase buttons 1930, 1931, 1932, and 1933. The number and content of buttons displayed in the selection region 1903 are merely exemplary and are not limited thereto.

When the user selects one piece of data from the table 1920 and operates any of the phase buttons 1930, 1931, 1932, and 1933, an output request including an ID, a field, a purpose, and a phase of the selected data is transmitted to the service development support system 100.

FIG. 18 is referred to for description. The service development support system 100 acquires a search condition included in the search execution request (step S801) and executes data search processing (step S802). The service development support system 100 displays a result of the data search processing in the table 1920.

The service development support system 100 determines whether the request received from the user is an output request (step S803).

When the request received from the user is a search execution request, the service development support system 100 returns to step S801.

When the request received from the user is an output request, the service development support system 100 specifies the data requirement with reference to the data requirement management information 312 (step S804).

Specifically, the service development support system 100 searches for a record in which a combination of a field, a purpose, and a phase matches a combination of a field, a purpose, and a phase included in the search condition. The service development support system 100 displays a screen 2000 illustrated in FIG. 20. The screen 2000 includes a table 2010 for displaying the specified data requirements, an acquisition button 2020, and a cancellation button 2021.

When the user operates the acquisition button 2020, a data provision request is transmitted to the service development support system 100. When the user operates the cancellation button 2021, an end request is transmitted to the service development support system 100.

The service development support system 100 determines whether the request received from the user is a data provision request (step S805).

When the request received from the user is the end request, the service development support system 100 ends the processing.

When the request received from the user is a data provision request, the service development support system 100 generates use data based on the selected data and the specified data requirement and provides the use data to the user (step S806). Thereafter, the service development support system 100 ends the processing.

Specifically, the service development support system 100 acquires data from any one of the databases 110, 111, and 112 based on the data requirement and generates the use data. The acquired data may be generated as it is as the use data, or the use data may be generated by executing any processing on the acquired data.

The service development support system 100 may register the use data in the data catalog 400 as necessary.

FIG. 21 is a flowchart illustrating an example of data search processing executed by the service development support system 100 according to the first embodiment.

The service development support system 100 searches for data from the data catalog 400 based on the search conditions (a field, a purpose, a requirement, and a keyword) included in the search request (step S901).

Only data to which a tag indicating that the skill level is high is assigned may be set as a search target. Accordingly, it is possible to preferentially search for data for improving efficiency of service development/operation.

The service development support system 100 determines whether there is data satisfying the search condition (step S902).

When there is data satisfying the search condition, the service development support system 100 determines whether the skill level of the user who has requested the search is low (step S903). Since the method of determining the skill level of the user is similar to that in step S202, description thereof will be omitted.

When the skill level of the user who has requested the search is high, the service development support system 100 presents the searched data in the table 1920 of the display region 1902 (step S905) and ends the data search processing.

When the skill level of the user who has requested the search is low, the service development support system 100 searches for intermediate data which is related to the searched data and to which a tag indicating that the skill level is high is assigned, from the intermediate data management information 313 (step S904). The service development support system 100 presents the searched data and the searched intermediate data in the table 1920 of the display region 1902 (step S905) and ends the data search processing.

When it is determined in step S902 that there is no data satisfying the search condition, the service development support system 100 specifies an error factor by which the corresponding data has not been found (step S906).

The service development support system 100 determines whether the specified error factor can be avoided with reference to the error handling information 314 (step S907).

Specifically, the service development support system 100 acquires the ID of the specified error factor with reference to the table 1000 of the error handling information 314. The service development support system 100 searches for a record in which the acquired ID is set as the factor ID 1012 with reference to the table 1010 of the error handling information 314 and determines whether the avoidance possibility 1013 of the record is "possible". When the record avoidance possibility 1013 is "possible", the service development support system 100 determines that the specified error factor can be avoided.

When the specified error factor cannot be avoided, the service development support system 100 ends the data search processing.

When the specified error factor can be avoided, the service development support system 100 executes avoidance processing (step S908), and then ends the data search processing.

For example, when absence of the access right is an error factor, it is conceivable that the service development support system 100 executes avoidance processing by assigning the access right to the raw data or the duplicated data and performing the search again.

As described above, the service development support system 100 can provide data according to the phase of the life cycle of the application to the user.

The present invention is not limited to the above-described embodiments and includes various modifications. For example, the above-described embodiments have been described in detail in order to describe the present invention in an easy-to-understand manner, and are not necessarily limited to those having all the described configurations. Some of the configurations of the embodiments can be added to, deleted from, or replaced with other configurations.

Some or all of the above-described configurations, functions, processing units, processing means, and the like may be implemented by hardware, for example, by designing them with integrated circuits. The present invention can also be implemented by a program code of software that implements the functions of the embodiments. In this case, a storage medium recording the program code is provided to a computer, and a processor included in the computer reads the program code stored in the storage medium. In this case, the program code itself read from the storage medium implements the functions of the above-described embodiments, and the program code itself and the storage medium storing the program code configure the present invention. As a storage medium supplying such a program code, for example, a flexible disk, a CD-ROM, a DVD-ROM, a hard disk, a solid state drive (SSD), an optical disc, a magneto-optical disk, a CD-R, a magnetic tape, a nonvolatile memory card, a ROM, or the like is used.

The program code implementing the functions described in the present embodiment can be implemented by a wide range of programs or script languages such as assembler, C/C++, perl, Shell, PHP, Python, and Java (registered trademark).

Further, a program code of software implementing the functions of the embodiments may be distributed via a network to be stored in storage means such as a hard disk or a memory of a computer or a storage medium such as a CD-RW or a CD-R, and a processor included in the computer may read and execute the program code stored in the storage means or the storage medium.

In the above-described embodiments, the control lines and the information lines indicate what is considered to be necessary for the description, and do not necessarily indicate all the control lines and the information lines on the product. All the configurations may be connected to each other.

What is claimed is:

1. A computer system, the system comprising:
a database that stores a plurality of types of data; and
a processor that accesses a data catalog that manages an item for searching for the data stored in the database, and the processor is configured to:
hold data requirement management information for managing requirement data associated with a plurality of phases of a life cycle of an application and associated data requirement;
search for data matching a search condition from the data stored in the database with reference to the data catalog and presents the data to a user when a search request including the search condition is received;
generate a listing of phases associated with the data from the plurality of phases of a life cycle for the user to select;
specify the requirement data corresponding to a selected phase included in an output request with reference to the data requirement management information when the output request including information of data selected by the user and the selected phase is received; and
output use data to be used in the phase included in the output request based on the selected data and the specified requirement data.

2. The computer system according to claim 1, wherein the processor is further configured to
acquire an operation log related to development or operation of the application by a user who has satisfied a predetermined threshold condition, wherein the threshold condition comprises one of a threshold value of data registered by the user, a threshold value of applications registered by the user, a threshold number of uses of the data registered by the user, or a threshold number of uses of the applications registered by the user, and
generate the requirement data by analyzing the operation log and registers the requirement data in the data requirement management information.

3. The computer system according to claim 1, wherein the processor is configured to acquire the selected data from the database based on the specified requirement data and output the selected data as the use data.

4. The computer system according to claim 1, wherein the processor is configured to acquire the selected data from the database based on the specified requirement data and process the data to generate the use data.

5. The computer system according to claim 1,
wherein the data catalog includes information regarding a user who has registered the data,
wherein the computer system holds user management information for managing a skill level of a user, and uses the user management information to search for the data satisfying the search condition among the data registered by a user who has satisfied a predetermined threshold condition, and
wherein the threshold condition comprises one of a threshold value of data registered by the user, a threshold value of applications registered by the user, a threshold number of uses of the data registered by the user, or a threshold number of uses of the applications registered by the user.

6. The computer system according to claim 1, wherein the computer system
holds intermediate data management information for managing intermediate data that is generated or used in processing related to data registered in the data catalog and is not registered in the data catalog,
specifies the intermediate data related to the data matching the search condition with reference to the intermediate data management information, and
presents the data matching the search condition and the specified intermediate data to the user.

7. A data providing method executed by a computer system,
wherein the computer system
is connected to a database that stores a plurality of types of data,
is capable of accessing a data catalog that manages an item for searching for the data stored in the database,
holds data requirement management information for managing requirement data associated with a plurality of phases of a life cycle of an application and associated data requirement, and
wherein the data providing method comprises:
searching for, by the computer system, data matching a search condition from the data stored in the database with reference to the data catalog and presenting the data to a user when a search request including the search condition is received;
generates a listing of phases associated with the data from the plurality of phases of a life cycle for the user to select;
specifying, by the computer system, the requirement data corresponding to a selected phase included in an output request with reference to the data requirement management information when the output request including information of data selected by the user and the selected phase is received; and
outputting, by the computer system, use data to be used in the phase included in the output request based on the selected data and the specified requirement data.

* * * * *